July 18, 1967 J. T. NEISWINTER ETAL 3,331,923

TELEGRAPH LEG DISCONNECT DEVICE

Filed Oct. 24, 1963 2 Sheets-Sheet 1

INVENTORS
JAMES T. NEISWINTER
CARL N. PEDERSON
BY Hofgren, Wegner, Allen, Stellman & McCord
Attys.

TELEGRAPH LEG DISCONNECT DEVICE

Filed Oct. 24, 1963

United States Patent Office 3,331,923

Patented July 18, 1967

3,331,923

TELEGRAPH LEG DISCONNECT DEVICE

James T. Neiswinter, Garden City, N.Y., and Carl N. Pederson, Westmont, Ill., assignors to Pioneer Electric and Research Corporation, a corporation of Illinois Filed Oct. 24, 1963, Ser. No. 318,700
2 Claims. (Cl. 178—69)

ABSTRACT OF THE DISCLOSURE

In a Teletype system for each receive leg connected to a common receive hub a controller senses the direction from which a data signal is being received and, upon the receipt of data at the receive hub from an associated receive leg, prevents transmission of signals of a spurious nature from its own receive leg to the receive hub until the expiration of a predetermined time after the cessation of reception of the prior detected incoming data. Therefore, once reception of data over one receive leg at a common hub begins, the other common legs are prevented from interfering with such data reception unless an "over-ride" of such data reception is initiated.

Figure 1:
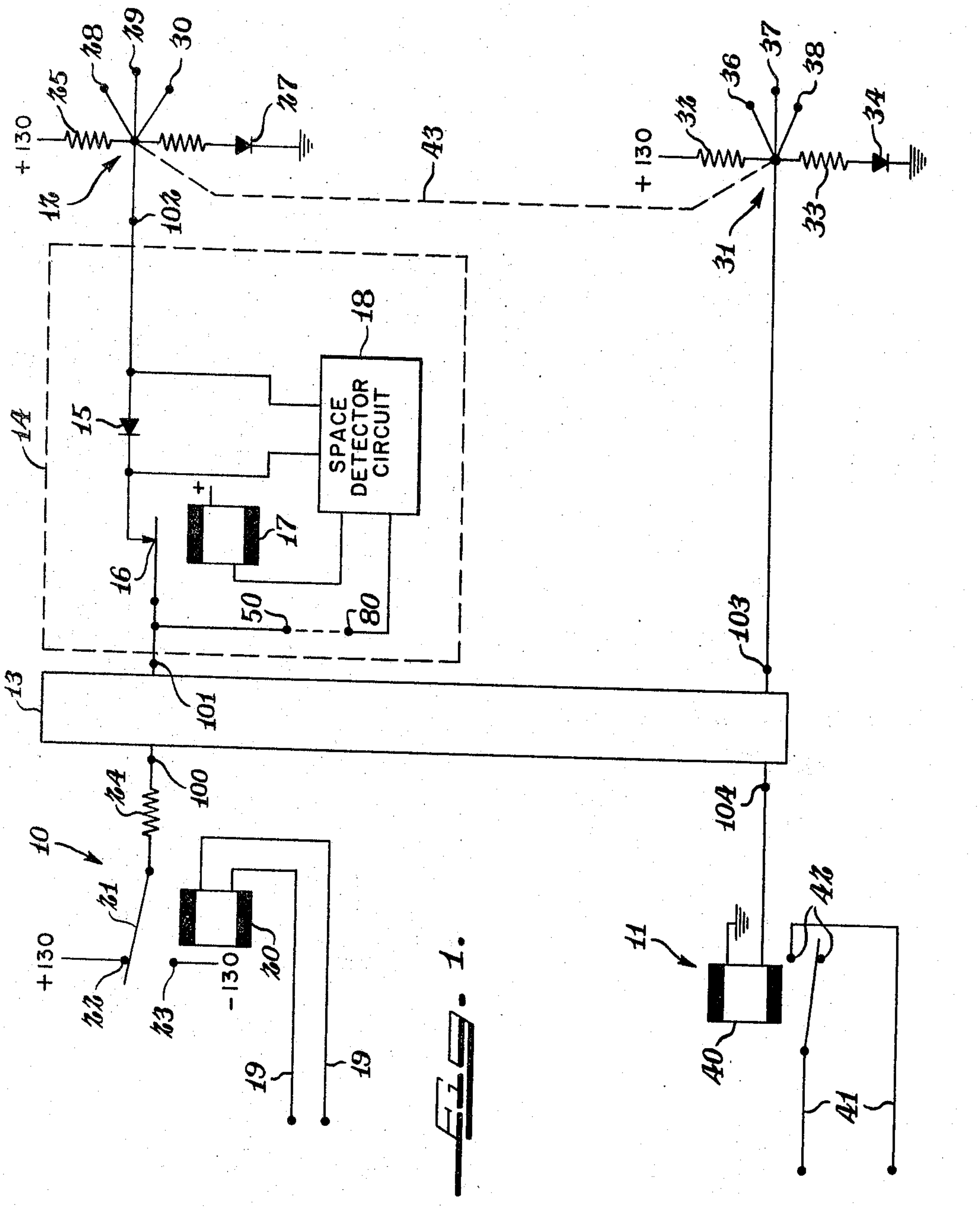

The present invention relates to a telegraph leg disconnect device and more particularly to a device for disconnecting a telegraph receive leg from a telegraph receive hub, when signals are being originated on another receive leg connected to the receive hub.

In the operation of telegraph legs composed of a receive leg and a send leg, the receive leg of the telegraph leg is connected to a common receive hub and the send leg of each telegraph leg is connected to a common send hub. If no regeneration is provided, the receive hub is connected directly to the send hub. If regeneration is provided, the receive hub connects to the send hub through a one-way regenerative repeater so that signals incoming on any receive legs pass through the repeater and are regenerated before going out on the send legs. With either the direct connection, or the connection through a regenerative repeater from the receive hub to the send hub, signals incoming from any receive leg are passed through all send legs.

It is common practice at the present time to equip each telegraph leg with a duplex control circuit or coupling unit connected between the send and receive legs and the send and receive hubs. This unit prevents signals incoming on a given receive leg from going back out on the send leg of a particular telegraph leg so that the customer originating the signals from a distant point does not receive the same signal back again to break up his local copy. The duplex control circuit or coupling unit recognizes when signals are incoming on its particular receive leg, and during this time, it blocks its own send leg so that these signals do not go out on this leg.

During the time the signals are outgoing on a send leg, no signals are incoming, and the receive path of the leg is not in use except where a distant customer desires to "break" the signals on the send leg. Any noise or spurious signal that ocurs on a receive path can come in on the receive leg and interfere with a bona fide transmission which is reaching the receive hub from some other telegraph leg. The present invention prevents the interruption or destruction of a bona fide transmission which is reaching the receive hub from some other leg by disconnecting a receive leg of a telegraph leg from a receive hub at all times that the receive leg is not originating signals or is not originating a special "break" signal which is designed not only to break the signal on the corresponding send leg of the subject telegraph leg, but is also intended to pass through the receive hub and "break" the transmission occurring on other circuits.

Therefore, it is an object of the present invention to provide a new and improved telegraph circuit.

An additional object is to provide a device which prevents noise, spurious signals, and undesired "break" signals from feeding into a receive hub from a receive leg.

Another object is to provide a device which can be inserted between a receive leg of a telegraph leg and a receive hub which will allow only signals originating on a receive leg to reach a receive hub when there are no prior transmissions being received on that hub from other legs, or whenever a special "break" signal is originated on the receive leg that is intended to break into previously commenced transmissions occurring at the receive hub.

A further object is to provide a rectifier and a pair of relay contacts which are adapted to be inserted between a receive leg of a telegraph leg and a receive hub and to provide a circuit for detecting signals on said receive leg and said receive hub to automatically operate said relay contacts.

Figure 2:
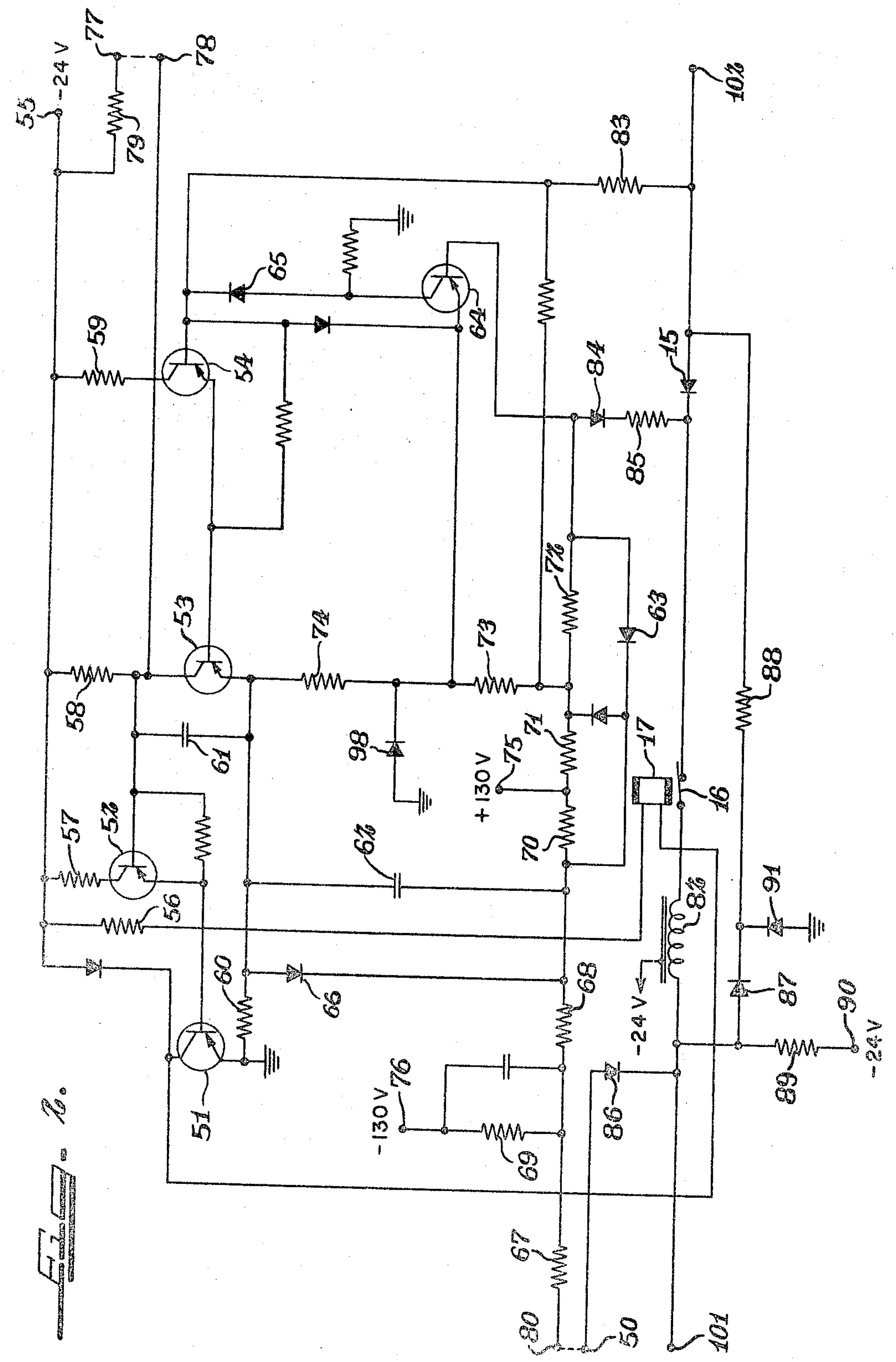

Further objects and advantages will become apparent from the following detailed description taken in connection with the accompanying drawings, in which:

FIGURE 1 is a diagram of an embodiment of the present invention inserted into a telegraph circuit, and FIGURE 2 is a detail schematic diagram of the embodiment of the invention shown in FIGURE 1.

While this invention is susceptible of embodiment in many different forms, there is shown in the drawings and will herein be described in detail, an embodiment of the invention with the understanding that the present disclosure is to be considered as an exemplification of the principles of the invention and is not intended to limit the invention to the embodiment illustrated. The scope of the invention will be pointed out in the appended claims.

Referring first to FIGURE 1, a telegraph leg consists of a receive leg, generally indicated at 10, and a send leg, generally indicated at 11. The receive leg 10 is connected to a receive hub, generally indicated at 12, through a terminal 100, through a leg coupling unit, as represented by the box 13, through a terminal 101, through a control device, generally indicated within the dashed line 14, and through a terminal 102. The control device consists of terminals 101 and 102, a rectifier 15, a pair of relay contacts 16, a relay coil 17 connected to operate the contacts 16, and a space detector circuit 18. The rectifier 15 and the contacts 16 are serially connected between receive leg 10 and receive hub 12. The relay coil 17, when energized, closes the contacts 16. The space detector circuit 18 is connected to both sides of the rectifier and both sides of contacts 16 in order to sense the presence of signals originating on the receive leg 10 and from other legs connected to the receive hub 12 and to utilize this information for automatically connecting and disconnecting the receive leg 10 to the receive hub 12 in accordance with predetermined criteria.

The receive leg 10 consists of a receive line 19 terminating in a relay coil 20 which, when energized, moves a movable relay contact 21 from a fixed contact 22 to a fixed contact 23. Contact 22 is connected to a positive 130 volt direct current potential source, and contact 23 is connected to a negative 130 volt direct current potention source. A 3,000 ohm resistor 24 is connected in series with the movable contact 21, the coupling unit 13, the control device 14, and the hub 12. The hub 12 consists of a 5,000 ohm resistor 25, a 4,000 ohm resistor 26, and a rectifier 27 serially connected between a 130 volt direct current source (not shown), and ground.

The receive leg 10 is connected to the juncture of the resistors 25 and 26 as are the receive legs indicated by the terminals 28, 29 and 30 of other telegraph legs.

A send hub, generally indicated at 31 is similarly constructed to the receive hub 12 having a 5,000 ohm resistor 32, a 4,000 ohm resistor 33, and a rectifier 34 serially connected between a positive 130 volt direct current source and ground. The send legs of other telegraph legs are connected to the juncture of resistors 32 and 33, as indicated by the terminals 36, 37 and 38. The send leg 11 consists of a send relay 40, connected in series between the aforementioned juncture of resistors 32 and 33 and ground, and a send line 41, which has a pair of relay contacts 42 operated by relay coil 40 serially connected in the line 41.

If the controller device 14 were not connected between the receive leg 10 and the receive hub 12 in FIGURE 1, and receive leg 10 was connected directly to the hub 12, FIGURE 1 would illustrate a typical telegraph leg having its receive and send legs connected, respectively, to a receive hub and a send hub through a coupling unit. The receive legs 28, 29 and 30 are identical to the receive leg 10 and the send legs 36, 37 and 38 are identical to the receive leg 11. Assuming for the moment that the control device 14 has not been inserted between the receive leg 10 and the receive hub 12, the operation of a typical telegraph leg without the control device 14 will be described. When there is no signal on the receive line 19, the coil 20 is de-energized and the leg is said to be "marking." With the movable relay contact 21 in contact with the contact 22, which is connected to 130 volt direct current source, the voltage on the receive hub 12 at the juncture of resistors 25 and 26 will be a positive 60 volts, which is the "marking" condition of a receive hub. This condition will, of course, exist only if the other receive legs 28, 29 and 30 attached to the hub 12 are also in a "marking" state. When a signal is originated on receive line 19, the relay coil 20 will be energized each time a pulse is received on line 19. The time during which a pulse is being received is referred to as "spacing." When line 19 is spacing, relay coil 20 moves contact 21 into contact with fixed contact 23 which is connected to the negative 130 volt direct current source. With a negative 130 volts applied to the hub 12 through the register 24, the voltage on the hub 12 at the juncture of resistors 25 and 26 will be a negative 30 volts, which is the "spacing" condition for a receive hub. Similarly, the "marking" condition of the send hub 31 is a positive 60 volts at the juncture of resistors 32 and 33, and its "spacing" condition is a negative 30 volts at the juncture of the resistors.

When the send hub 31 is "spacing," the juncture of the resistors 32 and 33 is a negative 30 volts, and the rectifier 34 will not pass current between the hub and ground. Therefore, the relay 40 can be energized only when the hub is "marking" at a positive 60 volts. The contacts 42 are utilized to close the send line 41 to place the line in a "marking" condition. While the relay 40 is de-energized, the relay contacts 42 will remain open and, in this condition, the send line 41 is "spacing." When no regeneration is provided, the receive hub 12 is connected directly to the send hub 31 as indicated by the dash line 43. If regeneration is provided, the receive hub connects to the send hub through a one-way regenerative repeater which would be serially connected in the line 43 so that signals incoming on any receive legs pass through the repeater and are regenerated before going on to the send legs. Therefore, any signal orignated on any one of the receive legs 10, 28, 29, or 30 will be transmitted out through the legs 11, 36, 37 and 38. While it is desired that a message originated on any one of the receive legs be transmitted out on the send legs of the respective telegraph legs, it is not desirable to return the same signals upon the send leg of a telegraph leg in which the signals have originated. Therefore, to prevent a signal originated through receive leg 10 from being re-transmitted on send leg 11, the duplex control circuit, or coupling unit 13, is connected between the send and receive legs 10 and 11 and the receive and send hubs 12 and 31. A duplex control circuit prevents signals incoming on a given receive leg, such as 10, from going back out on the send leg, such as 11, of the same telegraph leg. In this way, the customer originating the signals from a distant point does not receive the same signal back to break up his local copy. A duplex control circuit, such as 13, recognizes that signals are incoming on its associated receive leg, such as 10, and during this time, it blocks its own send leg 11 so that these signals do not go out on this leg. Duplex control circuits are employed on all telegraph legs for this purpose. When a signal is orignated on the receive leg 28, it will appear at receive hub 12 and be transferred to send hub 31 which will, in turn, transmit it on send legs 37, 38 and 11. If, during the time such a transmission is in progress, there is a defect in receive leg 10, or to some circuit that feeds into receive leg 10, creating undesired noise in the form of spurious signals, these signals will feed through leg 10 into hub 12 and be superimposed upon the signals being originated on receive leg 28 so that all the send legs, except 36 which is inactivated by a duplex control circuit, will receive the spurious signals in addition to the intended copy. Thus, a defective circuit or a spurious signal feeding into any one of the receive legs which are not originating the signals will nevertheless superimposed noise upon the copy of the receive leg which is properly transmitting a message. In this manner, the noise and spurious signals from any or all of these other receive legs will appear on all of the send legs except 36. Therefore, noise and spurious signals which are due to a defect in equipment associated or in any way connected with one receive leg, can effectively destroy or seriously hamper all transmissions originated on any other receive leg.

During the time that a telegraph leg is receiving a message to its send leg, the receive leg may be utilized by a distant customer to "break" the signals on the send leg of the same telegraph leg. Whenever such a distant customer transmits a "break" signal on the receive leg 10 by making the leg "space" for a substantial period of time, this "space" will feed into hub 12 and block out the message which is being transmitted by send hub 31 on all the send lines. Thus, a "break" signal which is intended only to break up the copy on the send leg 11 will break up the copy on any other send legs connected to the hub 31, such as 37 and 38, which is not blocked by a duplex control circuit associated with the transmitting telegraph leg.

The present invention, by inserting the control circuit 14 between a receive leg and a receive hub, eliminates transmissions from being destroyed or hampered by noise, spurious signals, or "break" signals which are intended only to break up the copy on the send leg associated with the receive leg upon which the "break" signal is originating. Each telegraph leg which is to be isolated from a receive hub at all times when it is not transmitting a proper message or "break" signal intended for other telegraph legs, has a control circuit, such as 14, connected between its receive leg and the respective receive hub in the manner that control circuit 14 is connected between the receive leg 10 and the receive hub 12 in FIGURE 1.

Turning now to the operation of the circuits illustrated in FIGURE 1, when a control circuit 14 has been placed between the receive leg 10 and the receive hub 12, it will be seen that the receive hub 12 can receive signals from the receive leg 10 only when relay contacts 16 are closed. The control circuit 14 is connected between the receive leg 10 and the receive hub 12 by the terminals 101 and 102, respectively. When the receive leg 10 is "marking," it will provide 130 volts to the control circuit 14 via terminal 101 and when the receive hub 12 is "marking," it will provide a positive 60 volts to the control circuit 14 via terminal 102. These two voltages are detected by the space detector circuit 18, and the space detector circuit operates the relay coil 17 so that the contacts 16 are closed only when no signal is to be originated on any receive leg, a signal is being originated on the receive leg 10, or a special "break" signal is originated on leg 10 to break the message being transmitted through hub 12 from another leg. When both the leg and the hub are marking, the hub 12 will be at 60 volts and the space detector circuit 18 will energize the coil 17 closing the contacts 16. Under this condition, the circuit is ready to transmit the first space originated on leg 10 to the hub 12 when it occurs. When both the leg 10 and the hub 12 are marking, and when a first space of a transmission originating on receive leg occurs, the voltages on both sides of rectifier 14 will be −30 volts, and under this condition, the space detector circuit 18 will maintain the relay coil 17 energized so that the leg 10 remains connected to the hub 12. A time delay, which will be presently described in greater detail, is built into the space detector circuit 18 so that it does not de-enerizge the relay coil 17 during the short "marks" between the spaces of a message. However, if both the leg 10 and the hub 12 are "marking" and another leg starts a message by beginning to space, the hub 12 will go "spacing" which places a −30 volts on terminal 102 to the right of rectifier 15 and a +60 volts from the leg on terminal 101 to the left of rectifier 15. With respect to the hub, no current can flow through the rectifier 15, and it therefore maintains the separation of the voltages. The spaced detector circuit 18, sensing the situation, de-energizes the coil 17 to allow contacts 16 to open and disconnect receive leg 10 from hub 12. As aforementioned, the time delay built into the space detector circuit 18 will not allow coil 17 to be re-energized during the short "marks" occurring in a message. Therefore, as long as one of the legs 28, 29 or 30 is transmitting a message through the hub 12, the space detector circuit 18 will control the contacts 16 so that the leg 10 is disconnected from the hub 12. If the messages originated on leg 28, the control circuits similar to 14 placed in those legs will also disconnect those legs while the message is being transmitted from the receive leg 28 to the hub 12. If the control circuit has been preset for a special "break" signal to be transferred to the hub 12 whenever it originates from the leg 10, the connection is made at the dashed line between a pair of terminals 50 and 80 so that the space detector circuit is connected directly to terminal 101 and thereby to leg 10. The space detector circuit 18 can then sense the occurrence of an 800 microsecond "space" pulse, and under this condition, energizes the coil 17 so that the contacts 16 close, allowing a latter part of the 800 microsecond pulse to be transmitted to the receive hub 12.

By now referring to FIGURE 2, the operation of the space detector circuit 18 will be described in greater detail. The space detector circuit 18 has four type 2N404 transistors 51, 52, 53, and 54 connected in common collector circuits with their collectors connected to a terminal 55 which is connected to a −24 volt direct current source (not shown) through an 820 ohm resistor 56, a 15,000 ohm resistor 57, a resistor 58, whose value is selected to set an R-C timing circuit to 150 milliseconds, and a 47,000 ohm resistor 59, respectively. The transistor 54 acts as a preamplification stage for transistor 53 by having its emitter connected to the base of transistor 53, and the transistor 52 acts as a preamplification stage for transistor 51 by having its emitter connected to the base of transistor 51. The emitter of transistor 51 is connected directly to ground while the emitter of transistor 53 is connected through a 24,000 ohm resistor 60. The collector of transistor 53 is connected to the base of transistor 52 so that when transistor 53 is non-conducting, transistor 52 will be conducting and, conversely, when transistor 53 is conducting, transistor 52 will be rendered non-conducting by transistor 53. A 3.3 microfarad condenser 61 is connnected across the emitter and collector of transistor 53 and a 15 microfarad condenser 62 is connected in series with the resistor 60 and a diode 63 to the base of a fifth type 2N404 transistor 64. An emitter of transistor 64 is connected to a base of transistor 54 through a rectifier 65. A rectifier 66 is connected in parallel with the capacitor 62 in order to fully discharge it whenever the top of the capacitor is positive with respect to the bottom. Resistors 67–74 are connected as shown in FIGURE 2 relative to a terminal 75 which is connected to a positive 130 volt direct current source (not shown) and relative to a terminal 76 connected to a negative 130 volt direct current source (not shown) in order to provide appropriate voltage divider networks for the operation of transistors 53, 54 and 64, as will be presently described in greater detail. These resistors have the following respective resistances: 67—47,000 ohms; 68—82,000 ohms; 69—180,000 ohms; 70—120,000 ohms; 71—11,000 ohms; 72—180,000 ohms; 73—3,000 ohms; 74—1,200 ohms.

A pair of terminals 77 and 78 are connected in a circuit parallel to resistor 58 so that if they are connected together, a 220,000 ohm resistor 79 will be connected in parallel with the resistor 58. As aforementioned, the terminal 101 is connected to receive leg 10 and the terminal 102 is connected to receive hub 12. Serially connected between these two terminals are the rectifier 15, the relay contacts 16 and an inductor 82. The base of transistor 54 is connected to terminal 102 through a 270,000 ohm resistor 83, and the base of transistor 64 is connected through a rectifier 84 and an 180,000 ohm resistor 85 to the left-hand side of rectifier 15. A rectifier 86 is connected to the terminals 50. Thus, it can be seen that the portion of the circuit shown in FIGURE 2 thus far described comprises the space detector circuit 18, shown in FIGURE 1, that is connected to both sides of rectifier 15 and, when desired, to terminal 101 and the left side of contacts 16.

In addition to the space detector circuit 18. FIGURE 2 illustrates in detail a bypass circuit consisting of a rectifier 87 and an 150,000 ohm resistor 88 connected between the terminals 101 and 102, a 470,000 ohm resistor 89 connected between one side of the rectifier 87 to a terminal 90 which is connected to a negative 24 volt direct current source (not shown) and a rectifier 91 connected between the other side of rectifier 87 and ground.

The operation of the space detector circuit illustrated in FIGURE 2 will now be described in greater detail. When there is a positive 60 volts on the receive hub 12, this voltage will be present on terminal 102. The resistor 83 drops this positive 60 volts to a positive 40 volts at the base of transistor 54 to make the transistor non-conducting. Since the emitter of transistor 54 is connected to the base of transistor 53 to control it, transistor 53 will be non-conducting when transistor 54 is non-conducting. The transistor 53 has its collector connected to transistor 52 so that transistor 52 conducts whenever transistor 53 is not conducting. Transistor 52 has its emitter connected to the base of transistor 51 so that it will conduct whenever transistor 52 is conducting to energize relay coil 17 closing contacts 16 and connecting terminal 101 to terminal 102 through the rectifier 15. Therefore, rendering transistor 54 conducting results in the closing of contacts 16 to join the receive leg to the hub. In this manner, the leg is joined to the hub whenever the hub is "marking" for a period greater than the spaces in a message transmission.

When a transmission is received from a leg other than leg 10, the hub and terminal 102 will be at a negative 30 volts, while the receive leg 10 and the terminal 101 will still be at a positive 60 volts. The negative voltage on the base of transistor 54 allows the transistors 54 and 53 to become conducting, which results in transistors 52 and 51 being rendered non-conducting. With transistor 51 non-conducting, relay coil 17 is de-energized opening contacts 16 and disconnecting the receive leg 10 from the receive hub 12. Therefore, with the receive leg marking and the hub receiving and re-transmitting a message from one of the other legs which cause it to repeatedly "space," the rectifier 15 separates the leg's positive 60 volt "marking" from the hub's negative 30 volt "spacing." Since it is undesirable to have the leg reconnected to the hub each time the hub "marks" between the "spaces" of a message originated on another leg, the capacitor 61 makes it possible to keep the contacts 16 open for a period of at least 110 microseconds. When the first space of a message from another leg is received on the receive hub 12, and therefore terminal 102, the conduction of transistor 53 charges the voltage on the top of capacitor 61 from approximately zero volts, which it has had because of the conduction of transistors 52 and 51, to a positive 10 volts. At the end of the first "space" of the message received from another leg, the receive hub voltage will return to a positive 60 volts to provide the "mark" following the first "space." At this moment, transistors 54 and 53 will become non-conducting. However, when transistor 53 becomes non-conducting, the voltage on the top of condenser 61 starts to drop from a positive 10 volts, which is gained during the first "mark" toward negative 24 volts, which appears on terminal 55 due to the discharging action through resistor 58. If there is no strap connecting terminals 77 and 78, approximately 110 milliseconds will be required for the voltage on the top of the condenser 61 to change from a positive 60 volts to a few tenths of a volt negative. As soon as the condenser has become slightly negative, transistors 52 and 51 will conduct. Thus, the contacts 16 will not be closed for at least 110 milliseconds after a "mark" appears following a "space" on the hub 12. The 110 millisecond delay is sufficient to prevent contacts 16 from reconnecting receive leg 10 during the "marks" in the middle of a message for continuous automatic Teletype signals at speeds of 75 and 100 words per minute. Therefore, the receive leg remains cut off from the receive hub during the entire transmission from any other receive leg, for continuous automatic Teletype signals at speeds of 75 and 100 words per minute. However, in the case of 60 words per minute speed transmission, the mark pulse in the letter characters is 132 microseconds long, which is sufficient to allow contacts 16 to close during each letter character. Although the probability of noise or "break" signal, which is not intended for the hub, passing through during the 22 microseconds between the time that the relay contacts open and the next "space" at the hub is relatively small, it is nevertheless desirable to remove all possibility of interference either from noise, spurious signals, or "break" signals not intended for the hub. Therefore, a strap may be utilized to join terminals 77 and 78 together, which places resistor 79 in parallel with resistor 58 between condenser 61 and terminal 55. With the strap in place, the discharge rate of condenser 61 is reduced so that 150 milliseconds is required from the time that transistor 53 becomes non-conducing before transistors 51 and 52 become conducting to close contacts 16 by energizing relay 17. With a 150 millisecond delay, there can be no noise, spurious signals, or unwanted "break" signals feeding through from leg 10 to hub 12. When a "space" signal originates on receive leg 10, which places a negative 30 volts on terminal 101, as previously described, the contacts 16 will be open if another leg is transmitting to the hub 12 at this time. However, if no other leg is transmitted so that the hub 12 has been "marking" for a period of either 110 milliseconds or 150 milliseconds, depending upon the speed of telegraph transmission being utilized, the contacts 16 are closed, and the negative 30 volts at terminal 101 will cause a negative 30 volts at terminal 102 since the rectifier 15 will pass current when the terminal 101 goes negative with respect to the hub 12. Thus, the voltages on both sides of the rectifier 15 are now at a negative 30 volts which causes transistor 64 to conduct because its emitter is at a voltage of +15 volts, which is created by a zener diode 98. With transistor 64 conducting, the base of transistor 54 is clamped to a positive 15 volts which holds transistor 54 in its nonconducting state. Thus, even though the hub has gone to a negative 30 volts, transistor 64 keeps transistor 54 non-conducting as it was when both the hub and leg were "marking."

A "special break" signal is a space of 800 milliseconds or more from a receive leg. When a message is being received from another leg at the receive hub 12, this message may be "broken" by an 800 millisecond "break" signal originated on receiving leg 10, if a strap has been placed across the terminals 50 and 80. The placing of a strap across the terminals connects the terminal 101 to a resistor network consisting of resistors 68, 70, 71 and 72 through rectifier 86 to apply a positive voltage to the base of transistor 64 which renders transistor 64 non-conducting. Normally, the upper plate of capacitor 62 is at approximately 36 volts positive with respect to the lower plate. However, when the receive leg 10 goes to "spacing," the voltage at terminal 101 drops to approximately a negative 110 volts. This negative voltage is applied to the terminals 50 and 80 and resistors 67 and 68 to condenser 62. After a period approaching 800 milliseconds, the voltage on condenser 62 becomes negative so that as it is applied through diode 63 to the base of transistor 64, it will cause the diode to conduct, forcing transistor 54 to its non-conducting state. This results in contacts 16 closing in the manner previously described so that the last portion of the special "break" signals is transmitted to receive hub 12.

The employment of rectifier 15 between the receive leg 10 and the hub 12 may result in an undesired functioning of the coupling unit 13. As aforementioned, the coupling unit 13, by sensing a signal incoming on the receive leg, initiates the blocking of the send leg 11 from the send hub 31. When the circuit senses a "space" from any other receive leg, the circuit connects the leg 11 to the hub 31 so that the signal is transmitted out through send leg 11. With the rectifier 15 placed between the receive leg 10 and the receive hub 12, the negative 30 volts appearing on the receive hub 12 cannot be sensed by circuit 13. Thus, this would prevent the connecting of the send leg 11 to the send hub 31 for transmissions arriving on any one of the other receive legs 28–30 if a bypass circuit were not provided. The bypass circuit allows the negative 30 volts to reach the coupling unit 13. The bypass circuit must bypass the relay contacts as well as the rectifier 15 because, during the transmission of signals from the send hub to the send leg, the contacts 16 are open, disconnecting the receive leg connection. If, during this time, the coupling unit 13 happened to be thrown by induction in an office wiring, or for some other accidental reason, so that the send leg is opened, there would be no means for the voltage on the receive hub 12 to be detected by the coupling unit 13 to again join the send leg 11 to the hub 31.

There is a capacity in a Teletype office cabling between ground and terminals 101 and 102. When the contacts 16 close because of a "break" signal originating on the receive leg 10, the contacts 16 may close at a time when the voltage on the office capacity of the receive leg exceeds a negative 100 volts and the voltage on the office capacity of the receive hub is a positive 60 volts. This will result in two capacities, charged to a difference of over 160 volts being connected momentarily across the contacts 16. The capacity is small and the discharge that flows ceases very quickly. However, for a few microseconds, this current might be on the order of several amperes, and in the case of light contacts which are used on reed-type relays, it is sufficient to weld the contacts.

The inductor 82 limits the current to a value which will prevent damage to the contacts 16.

We claim:

1. A Teletype control circuit for insertion between a receive leg of a Teletype leg and a receive hub comprising:

switch contacts for disconnecting a receive leg from a receive hub;

a rectifier;

a pair of terminals of which one is adapted to be connected to a receive leg and the other is adapted to be connected to a receive hub;

said switch contacts and said rectifier being connected in series between said terminals;

a first transistor having a collector, an emitter and a base, said collector and emitter being adapted to be connected across a direct current source, said base being connected to one side of said rectifier and to said receive hub terminal;

a second transistor having a collector, an emitter and a base, said collector and emitter being adapted to be connected across a direct current source, said base being connected to the first transistor emitter;

a third transistor having a collector, an emitter and a base, said collector and emitter being adapted to be connected across a source of direct current voltage, said base being connected to said second transistor collector;

a relay coil controlling said switch contacts;

a fourth transistor having a collector, an emitter and a base, said collector and emitter being adapted to be connected in series with said relay coil across a direct current source, said base being connected to the third transistor emitter;

a resistance;

a condenser connected between the emitter and collector of said second transistor and adapted to be connected in series with said resistance across a direct current source;

a zener diode;

a fifth transistor having a collector, an emitter and a base, said collector being connected to said first transistor base, said emitter being adapted to be connected to a direct current source through the zener diode, said base being connected to the other side of said rectifier and to one of said switch contacts.

2. In combination with the control circuit of claim 1, another condenser connected between the second transistor emitter and the receive leg terminal; and another rectifier connected between said another condenser and said fifth transistor base.

References Cited

UNITED STATES PATENTS

| | | | |
|---|---|---|---|
| 2,069,251 | 2/1937 | Kinkead | 178—69 |
| 2,332,451 | 10/1943 | Marshall | 178—69 |
| 2,350,180 | 5/1944 | Miller | 178—69 |
| 3,288,929 | 11/1966 | Hutchinson | 178—69 |

NEIL C. READ, *Primary Examiner.*

THOMAS A. ROBINSON, *Examiner.*

UNITED STATES PATENT OFFICE

CERTIFICATE OF CORRECTION

Patent No. 3,331,923 July 18, 1967

James T. Neiswinter et al.

It is hereby certified that error appears in the above numbered patent requiring correction and that the said Letters Patent should read as corrected below.

Column 1, line 11, column 7, lines 40 and 44, column 8, line 62, and column 9, lines 4 and 5, for "Teletype", each occurrence, read -- telegraph --.

Signed and sealed this 2nd day of July 1968.

(SEAL)
Attest:

Edward M. Fletcher, Jr.
Attesting Officer

EDWARD J. BRENNER
Commissioner of Patents